(12) United States Patent
Koenneker et al.

(10) Patent No.: US 7,252,064 B2
(45) Date of Patent: Aug. 7, 2007

(54) SWITCHABLE AIR INTAKE SYSTEM FOR MULTI-CYLINDER INTERNAL COMBUSTION ENGINE

(75) Inventors: Reinhard Koenneker, Moensheim (DE); Walter Buck, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/331,062

(22) Filed: Jan. 13, 2006

(65) Prior Publication Data

US 2006/0201482 A1 Sep. 14, 2006

(30) Foreign Application Priority Data

Jan. 14, 2005 (DE) .................... 10 2005 001 862

(51) Int. Cl.
*F02B 27/02* (2006.01)
(52) U.S. Cl. .................. 123/184.55; 123/184.53; 123/184.59
(58) Field of Classification Search ........... 123/184.53, 123/184.35, 184.36, 184.55, 184.59
See application file for complete search history.

(56) References Cited

U.S. PATENT DOCUMENTS

| | | | | |
|---|---|---|---|---|
| 5,005,536 A | * | 4/1991 | Suzuki et al. | 123/184.35 |
| 5,048,471 A | * | 9/1991 | Takii et al. | 123/184.36 |
| 5,492,088 A | * | 2/1996 | Ohrnberger | 123/184.34 |
| 5,546,900 A | * | 8/1996 | Adamek et al. | 123/184.55 |
| 6,810,848 B2 | * | 11/2004 | Vadlja et al. | 123/184.55 |

FOREIGN PATENT DOCUMENTS

DE 43 33 053 A1 9/1993
DE 198 41 810 A1 9/1998

* cited by examiner

*Primary Examiner*—Willis R. Wolfe
*Assistant Examiner*—Jason Benton
(74) *Attorney, Agent, or Firm*—Crowell & Moring LLP

(57) ABSTRACT

A switchable air intake system for a multicylinder internal combustion engine has at least one short and one long intake manifold whose cross sections are controllable by at least one regulating unit as a function of operating parameters (in particular the rotational speed of the internal combustion engine). The short intake manifold for a first cylinder bank row and the long intake manifold for a second cylinder bank row of the internal combustion engine, are controllable via a joint regulating unit (56, 58).

8 Claims, 1 Drawing Sheet

SWITCHABLE AIR INTAKE SYSTEM FOR MULTI-CYLINDER INTERNAL COMBUSTION ENGINE

BACKGROUND AND SUMMARY OF THE INVENTION

This application claims the priority of German patent document 10 2005 001 862.9, filed Jan. 14, 2005, the disclosure of which is expressly incorporated by reference herein.

The present invention relates to a switchable air intake system for a multicylinder internal combustion engine.

So-called switching intake systems for improving the dynamic boosting of an internal combustion engine are disclosed in German Patent Documents DE 198 41 810 A1 and DE 43 33 053 A1. In the latter, a two-step change in the intake manifold length is effected with the help of a rotary slide valve which closes the short intake manifold, depending on its rotational position, while the long intake manifold is opened or vice versa.

One object of the present invention is to develop a switchable air intake system for a multirow internal combustion engine, in particular for a V-type engine, that has a compact design and can be manufactured inexpensively.

This and other objects and advantages are achieved by the switchable air intake system for a multirow internal combustion engine according to the invention, in which only two regulating units are required to control the two intake manifold lengths. This arrangement yields a compact design of the switchable air intake system, which can also be manufactured inexpensively.

In an advantageous embodiment of the invention, a rotary slide valve releases the short intake manifold as a function of its rotational position while the long intake manifold is sealed off by the rotary slide valve, or vice versa. In order to provide for effective switching of the air intake system, the short intake manifold assigned to the first cylinder bank row is arranged to intersect with the long intake manifold assigned to the second cylinder bank row, and the rotary slide valve is arranged in the intersection area, where there is a pipe section that is common to both the short intake manifold or the long intake manifold.

The air intake system is designed as a modular system, with a throttle valve provided in the flange area to the cylinder head for controlling the air supply to the individual cylinders.

The throttle valves of a cylinder bank row are jointly operable by one rod each. In addition, openings are provided in the flange area to the cylinder head in the module of the air intake system to accommodate fuel injectors.

Other objects, advantages and novel features of the present invention will become apparent from the following detailed description of the invention when considered in conjunction with the accompanying drawings.

BRIEF DESCRIPTION OF THE DRAWINGS

The single FIGURE shows a detail of an internal combustion engine having a switchable air intake system, according to the invention.

DETAILED DESCRIPTION OF THE DRAWINGS

Figure 1:
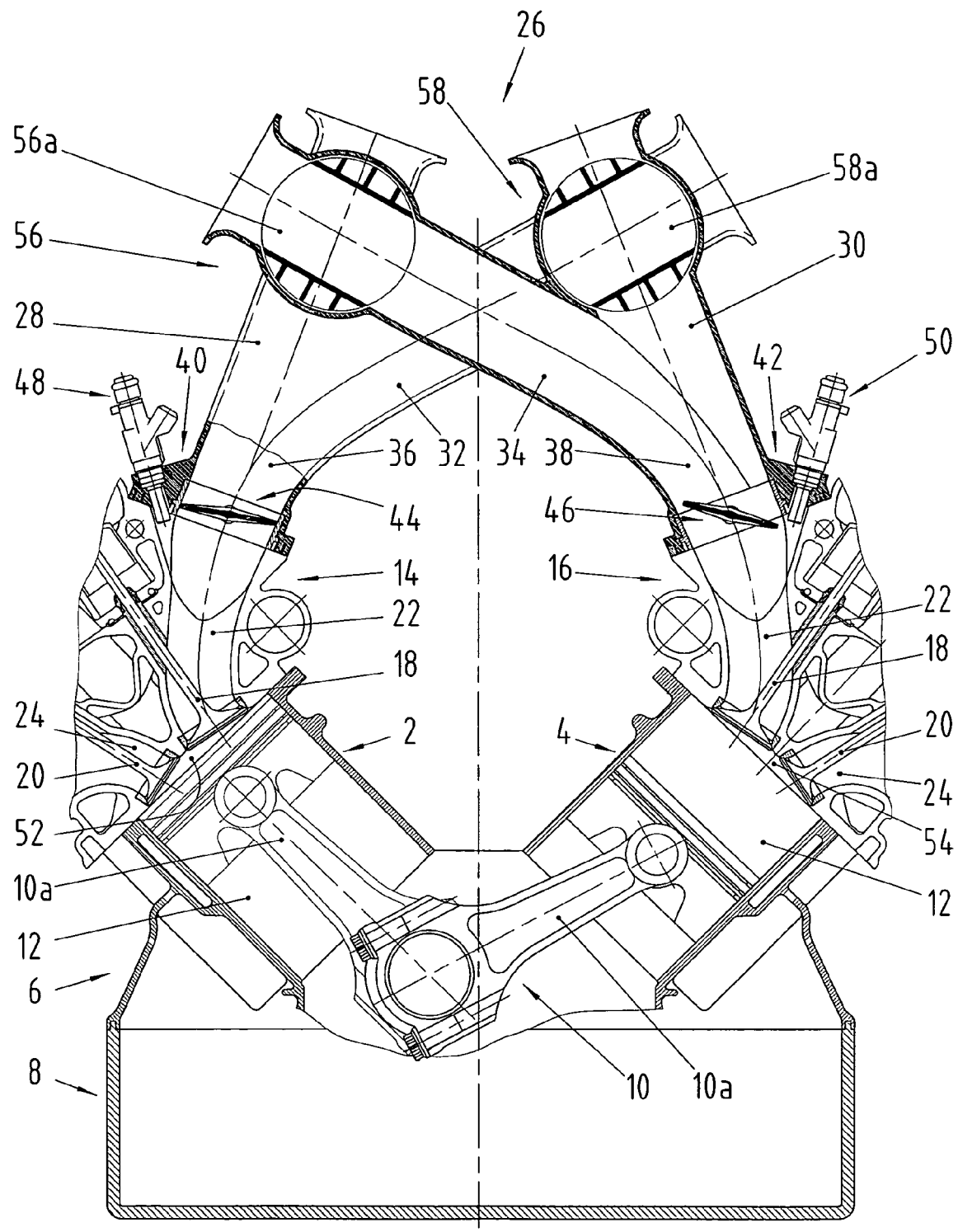

A multicylinder internal combustion engine, shown in the present exemplary embodiment as a V8 engine, has two opposing cylinder bank rows 2 and 4. The latter are integrated into a crankcase top part 6 to which is connected a crank case bottom part 8 designed as a crankshaft bearing bridge. A crankshaft 10 is mounted between the crankcase top part 6 and the crankcase bottom part 8 and is connected by its connecting rods 10a to the pistons 12 guided in the cylinders.

The two cylinder bank rows 2 and 4 also have two cylinder heads 14 and 16, in which there are provided, among other things, the inlet and outlet channels 22 and 24 that are controllable by inlet and outlet valves 18 and 20.

An air intake module 26 controlling the air supply to the individual cylinders is mounted on the two cylinder heads 14 and 16. The air intake module 26 has four short intake manifolds 28 and 30 and two long intake manifolds 32 and 34 for each cylinder bank row 2, 4. (Only the short intake manifolds 28, 30 and the long intake manifolds 32, 34 of one cylinder of the two cylinder bank rows 2 and 4 can be seen in the drawing.)

The short and long intake manifolds 28, 32 and 30, 34 assigned to the two cylinder heads 14, 16 are each designed in one piece and have a common pipe section 36 and 38. The end of the common pipe section 36 and/or 38 assigned to the two cylinder heads 14, 16 is accommodated in a flange 40 and 42, respectively, extending over the four cylinders of the V8 engine. The flange is provided for mounting the air intake module 26 on the two cylinder heads 14 and 16.

In the common pipe section 36, 38, a throttle valve 44, 46 provided for each cylinder is rotatably mounted on a common axle for controlling the air supply to the cylinders. In addition, four openings are provided in the two flanges 40 and 42, serving to accommodate four fuel injectors 48 and 50 each. The fuel injectors 48, 50 ensure in a known way that fuel—in the present case of intake manifold injection—can be supplied to the combustion chambers 52 and 54 via the intake channels 22 integrated into the cylinder heads 14, 16.

As the drawing shows, the short and long intake manifolds 28, 32 and/or 30, 34 are arranged and/or aligned with respect to one another so that the short intake manifold (28 or 30_ of the one cylinder bank row crosses the long intake manifold (32 or 34) of the other cylinder bank row, in the mouth area of each. A rotary slide valve 56, 58 is provided at each point where the short intake manifolds 28, 30 intersect the long intake manifolds 32, 34. In the rotary slide valves, a pipe section 56a and/or 58a has a diameter that matches the inside diameter of the short and long intake manifolds 28, 34 and/or 30 and 32. Depending on its rotational position, the rotary slide valve 56, 58 releases the channel of the short intake manifold 28 and/or 30, while the long intake manifolds 32 and/or 34 are closed, or vice versa.

In the position of the two rotary slide valves 56, 58 shown in the drawing, the long intake manifolds 32 and 34 are opened while the short intake manifolds 28 and 30 are closed.

As is known, gas vibration can be influenced by a suitable choice of the length of the intake manifold, so that the pressure wave passes through the opened intake valves and results in better filling. In the lower rotational speed range the long intake manifolds 32, 34 are opened, whereas at a high rotational speed, the long intake manifolds 32 and 34 are closed off by the rotary slide valves 56 and 58 and the short intake manifolds 28 and 30 are opened.

The air intake module 26 described above is also suitable in particular for V-type engines having two, six, ten or twelve cylinders through an appropriate variation in the number of intake manifolds 28 through 34.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A switchable air intake system for a multicylinder internal combustion engine, comprising:
   at least one short intake manifold;
   at least one long intake manifold; and
   a regulating element for controlling cross sections of the respective intake manifolds as a function of operating parameters; wherein,
   the at least one short intake manifold for a first cylinder bank row and the at least one long intake manifold for a second cylinder bank row of the internal combustion engine are controllable by a single joint regulating element;
   the joint regulating element comprises a rotary slide valve;
   the at least one short intake manifold assigned to the first cylinder bank row and the at least one long intake manifold assigned to the second cylinder bank row intersect; and
   the joint rotary slide valve is situated in an intersection area of the short and long intake manifold such that, depending on the position of the rotary slide valve, the at least one short intake manifold is opened while the at least one long intake manifold is closed, or vice versa.

2. The switchable air intake system according to claim 1, wherein the air intake system is designed as a module, with throttle valves for controlling the air supply to the cylinders are provided in a flange area of the cylinder head.

3. The switchable air intake system according to claim 2, wherein:
   the throttle valves of a cylinder bank row are mounted on an axle; and
   said throttle valves are operable jointly.

4. The switchable air intake system according to claim 3, wherein openings to receive fuel injectors are provided in the flange area of the cylinder head in the air intake module.

5. A switchable air intake system for a vehicle have first and second cylinder banks, comprising:
   a first plurality of intake manifolds for the first cylinder bank, said first plurality including at least one short intake manifold and at least one long intake manifold;
   a second plurality of intake manifolds for the second cylinder bank, said second plurality including at least one short intake manifold and at least one long intake manifold, said at least one short intake manifold for the first cylinder bank intersecting with said at least one long intake manifold for the second cylinder bank, and said at least one long intake manifold for the first cylinder bank intersecting with said at least one short intake manifold for the second cylinder bank; and
   regulating means situated at intersections of respective pairs of said short and long intake manifolds, for jointly regulating air flow through said intersections.

6. The switchable air intake system according to claim 5, wherein:
   said regulating means comprises a rotary slide valve situated in each of said intersections; and
   said rotary slide valve can be adjusted to direct air flow selectively to said short or long intake manifold.

7. The switchable air intake system according to claim 6, wherein said rotary slide valve is adjustable in response to an operating parameter of said internal combustion engine.

8. The switchable air intake system according to claim 1, wherein said operating parameters comprise engine speed.

* * * * *